United States Patent [19]
Wendel

[11] 3,749,462
[45] July 31, 1973

[54] SPINDLE COLLAR STORAGE FOR SPINDLES OF SPINNING AND THREAD MACHINES

[75] Inventor: Günther Wendel, Stuttgart, Germany

[73] Assignee: SKF Kugellagerfabriken Gesellschaft mit beschrankter Haftung, Schweinfurt, Germany

[22] Filed: July 7, 1971

[21] Appl. No.: 160,464

[52] U.S. Cl. .............................................. 308/228
[51] Int. Cl. .......................................... F16c 35/08
[58] Field of Search .................................... 308/228

[56] References Cited
UNITED STATES PATENTS
| | | | |
|---|---|---|---|
| 473,214 | 4/1892 | Douglas | 308/228 |
| 598,669 | 2/1898 | Campbell | 308/228 |
| 2,750,239 | 6/1956 | Rogner et al. | 308/228 |

FOREIGN PATENTS OR APPLICATIONS
| | | | |
|---|---|---|---|
| 8,248 | 1897 | Great Britain | 308/228 |
| 604,869 | 2/1926 | France | 308/228 |

Primary Examiner—Charles J. Myhre
Assistant Examiner—Frank Susko
Attorney—Richard Low and Murray Schaffer

[57] ABSTRACT

A bearing collar for the spindle of a spinning and twisting machine comprising an inner race ring fastened to the spindle and supported on the roller balls which are themselves supported on an outer race ring seated within the bearing housing. The outer and inner race rings are arranged so that the spindle is rotatably supported on insertion within the bearing housing but are axially separable on movement of the spindle outwardly of the housing.

4 Claims, 1 Drawing Figure

PATENTED JUL 31 1973 3,749,462
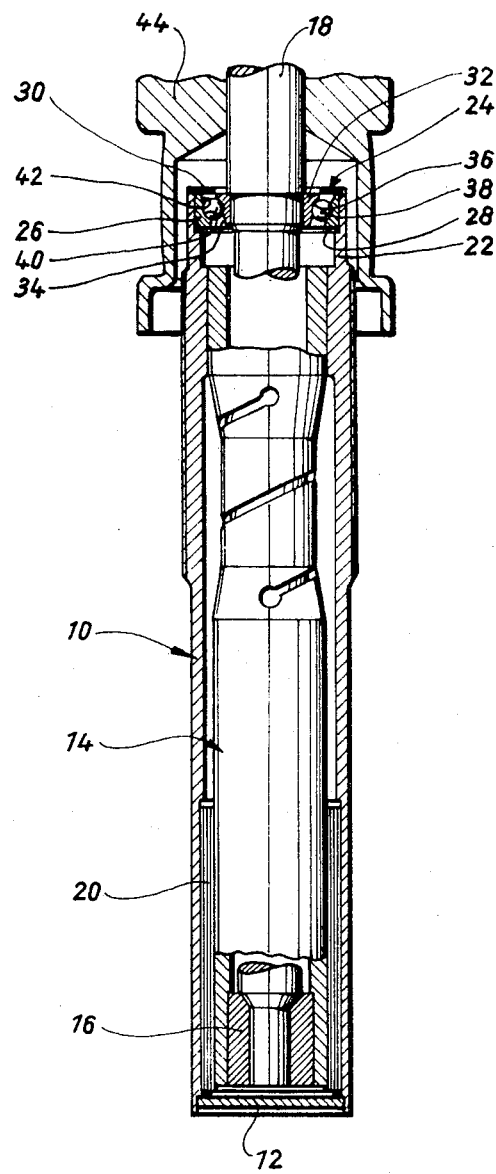
GÜNTHER WENDEL
Inventor:

SPINDLE COLLAR STORAGE FOR SPINDLES OF SPINNING AND THREAD MACHINES

BACKGROUND OF INVENTION

The present invention relates to yarn and thread spinning twisting machines and in particular to mechanism for mounting the spindle shaft thereof.

The spindle shaft on which the whorl or spinning head is mounted is located in a spindle bearing housing and is provided with a roller bearing collar at its upper end which permits free rotation while simultaneously acting to maintain the spindle axially oriented in the housing. Generally, the collar bearing comprises a single row angular race ball bearing having an inner bearing ring adjacent the spindle shaft and an outer ring adjacent the spindle bearing housing body. Spindle collar bearings of this type have been known for some time and have made possible high speed spindle rotation. They have also permitted such spindles to have a high thrust and axial load capacity in both the radial and axial directions.

Since spindles have a short operating life and are subject to excessive wear they must be frequently removed and replaced. During the time that they are exchanged, the spinning machine is shut down and therefore is necessary to provide structural mechanism which will permit the swift and easy exchange of the spindle. This, however, has not been the case with the known collar bearing mechanism used to support the spindles.

One known form of collar bearing is shown in U.S. Pat. 1,292,026. In this patent, the collar bearing comprises an outer bearing ring which is fixed to the top of the spindle bearing housing and covers or caps the inner bearing ring which is itself fixed to the spindle. This construction forms a buffer or stop, preventing the withdrawal of the spindle upwardly out of the spindle bearing housing unless the entire assembly is dismantled and removed.

In another form known from the Swiss Pat. No. 110,917 the outer bearing ring of the collar forms a coupling oil sump covering the inner bearing ring which is fixedly screwed to a base plate. The exchange of a spindle in this construction is possible only when a container serving as an oil sump is dismounted from the outer ring and the outer bearing ring is then uncoupled.

Similarly troublesome and disadvantageous is the contruction shown in German patent specification No. 572,433 wherein a cover for the ball bearings is fastened to the spindle bank or rail by fixed screws which must be removed before the spindle can be dismounted. In addition to the removal of the screws, a felt and metal gasket, which are also provided to seal the unit, must also be removed.

Finally, German patent specification No. 521, 534 and U.S. Pat. No. 3,438,191 show spindles having ball or roller bearings in which parallel races rather than angular races are employed. These bearings have to be carried or housed in an elastic or resilient carrier ring in order to enable them to compensate for the dynamic influences stressing the bearing in the radial direction. This type of bearing does not permit axial adjustment of the rings relative to each other and furthermore does not permit the easy dismounting of the spindle since the elastic ring must first be removed.

It is the object of the present invention to provide an improved collar bearing for mounting the spindle shafts in spindle housings.

It is another object of the present invention to provide a bearing collar for spindles, making it possible to easily remove the spindle from the bearing housing.

It is still another object of the present invention to provide a bearing collar for spindles avoiding the need for total dismounting of the spindle or spindle housing structure in order for the spindle to be removed.

These and other objects and numerous advantages will be seen from the foregoing specification of the present invention.

SUMMARY OF INVENTION

According to the present invention, a bearing collar for the spindle of a spinning and twisting machine is provided comprising an inner race ring fastened to the spindle and supported on the roller balls which are themselves supported on an outer race ring seated within the bearing housing. The outer and inner race rings are arranged so that the spindle is rotatably supported on insertion within the bearing housing but are axially separable on movement of the spindle outwardly of the housing.

Preferably the inner race ring has an outwardly directed shoulder extending over the balls which defines a ball race surface for the inner race ring. The shoulder has an outer circumference which may be cylindrical. In order to facilitate the frequent exchange of spindles and their ease in removal from the spindle bearing housing, it is preferred that the outer surface of the inner bearing ring be otherwise diminished and conically formed from the shoulder in the direction of the spindle end which is inserted within the spindle bearing body. This conical tapering of the inner bearing ring permits the easy setting or installation of the spindle within the ball cage of the bearing. The inner bearing ring has an axial cylindrical inner bore which fits over the end of the spindle which itself is cut down to form a shoulder which receives the inner ball bearing race. In this manner, the spindle can center itself automatically within the single row of balls and consequently within the outer bearing ring.

It is further preferred that the outer bearing ring have an inwardly extending shoulder and an outwardly conical bearing race surface extending similarly to but in an opposite direction as the conical surface of the inner bearing ring. This conforming or mirror image of the inner and outer bearing rings advantageously insures proper centering of the spindle.

An especially advantageous construction is provided when the end of the spindle is itself arranged with a step bearing having a centering tube located in the spindle bearing housing body. Vibration dampening means is located between the centering tube and the spindle bearing housing body. On the other hand, end of spindle may be directly embedded in the spindle foot mounted within the spindle bearing housing body.

Full details of the present invention are set forth in the following description in which reference is made to the accompanying drawings.

BRIEF DESCRIPTION OF THE DRAWINGS

In the drawing the FIG. 1 shows a vertical section through a spindle bearing housing employing the present invention.

DESCRIPTION OF INVENTION

As seen in the drawing, the spinning and twisting mechanism comprises a conventional spindle bearing housing body 10 which is insertable in a spindle bank or rail of conventional design and therefor not shown. The body 10 is closed at its long end with a tightly fitted disc or cover member 12. Within the tubular spindle body there is arranged a resilient or yieldable centering tube generally defined with a numeral 14. The centering tube is force fit at its upper end within the housing body and extends downwardly, radially spaced from the inner wall of the body. The lower end of the centering tube 14 is inserted in a spindle step bearing 16 which supports the lower end of a spindle 18 which is insertable axially within the spindle bearing housing body. A spiral resilient vibration damper mechanism 20 is arranged between the yieldable centering tube 14 and the inner wall of the spindle bearing body 10 to dampen the vibrations of the centering tube. The damper spiral 20 is immersed in an oil bath which serves as the dampening medium.

The upper part of the spindle bearing housing body 10 is cut down to form a neck 22 of enlarged diameter in which a spindle collar bearing generally defined by the numeral 24 is removably inserted. The spindle collar bearing 24 comprises an outer bearing ring 26 which is supported on a shoulder 28 formed by the cylindrical neck 22 with the remaining portion of the spindle bearing housing body. A snap ring washer fastener 30 is inserted within the neck 22 above the outer bearing ring 26 to secure this bearing ring firmly within the neck. The inner diameter of the washer fastener 30 is of enlarged dimension so that it overlies only the outer bearing ring 26. An inner bearing ring designated by the numeral 32 is fitted on the spindle 18 which is itself necked down or provided with an annular portion of smaller diameter to receive the bearing ring 32. The spindle may be force fit or fixedly secured. The neck down portion of the spindle 18 has a shoulder which engages the inner corner of the inner bearing ring 32 preventing its outward axial movement.

The race surface 34 of the inner bearing ring 32 has an outer circumferential extent of a cylindrical shape forming a radial shoulder 36 overhanging or overlapping the balls 38 arranged between the rings 26 and 32. The diameter of the cylindrical shoulder 36 is less than that of the inner diameter of the washer fastener 30. From this shoulder 36 the inner bearing ring 32 diminishes or tapers conically with respect to the axis of the spindle 18 in the direction of the spindle end inserted within the spindle bearing housing body (i.e. the lower end of the spindle). The outer bearing ring 26 is provided with a race surface similar to that of the surface 38 in that it too is provided with a radial shoulder 40 and a conically tapering surface. However, the surface 42 of the outer ring tapers conically in an outer direction rather than in the inner direction of the race of inner race ring 32. The bearing balls 38 are maintained in a ball cage of known design and rest on the shoulder 40 of the outer bearing 26.

A spinning whorl 44 is located over the outer end of the spindle 18. The snap ring 30 extends over only the outer bearing ring 26; consequently, it is possible that the spindle 18 which carries the driving whorl 44 can be removed at any time from the centering tube 14 of the spindle bearing body and thereby from the collar bearing 24. The inner bearing ring 32 may be removed simultaneously with the spindle 18 since it is of lesser diameter than the washer fastener 30 and it can be axially moved in an upward direction through its center. It will be obvious, of course, that his procedure and the reverse operation or insertion of the spindle within the inner bearing ring can both be made without the dismanteling of the outer bearing ring and/or the removal of the balls from the bearing housing.

The conical tapering of the inner and outer rings 26 and 32 respectively allows the bearing collar 24 to automatically arrange itself in proper axial and radial alignment so that it can absorb high loads in both the downward axial direction as well as in the outward radial direction; thus satisfying the basic need of such construction to provide high load capacity and high efficiency. The conical tapering of the inner and outer rings also permits the spindle to freely move in an axial outward direction without dismanteling either the bearing housing body and/or the entire collar mechanism 24 itself. It will be appreciated that the snap ring washer 30, the outer bearing ring 26, and the bearing balls 38 all remain situated in their location within the spindle bearing housing even when the spindle 18 is removed. If desired the inner bearing ring 32 may also be left in place. It will also be appreciated that the shape of the race surface 42 of the outer bearing is to be designed so that the balls 38 remain seated in the bearing even with the removal of the spindle 18 and its associated inner bearing ring 32.

It will be observed that the present collar 24 permits the insertion of the spindle 18 fully within the bearing housing body 10 so that its end will firmly rest within the centering tube 14 and be responsive to the dampening mechanism. Further the end will be allowed to rest on the foot step bearing 16 so as to be thus securely supported at its lower end as well as at its upper end. The tapering race surfaces of the bearing rings 26 and 32 allow axial movement of the spindle so that the high load of operation can be absorbed by both the collar 24 and the footstep bearing 16. This construction allows removal of the cover disk 12 and replacement of the foot step bearing and oil dampening media etc. without disturbance of the collar bearing 24.

It will also be appreciated that the present construction is rather simple, and easily obtained. It may be easily assembled in existing spindle and spindle bearing housing and is therefore quite economical. This construction permits the use of the simple centering tube and dampening mechanism shown and permits such mechanism to be integrally maintained within the bearing housing even on removal of the spindle 18.

It will be appreciated that various modifications and changes may be made and that the present disclosure is by way of illustration only.

What is claimed

1. Yarn spinning or twisting apparatus comprising a cylindrical bearing housing having a footstep bearing at one end, a spindle axially located within said housing having one end engaging said footstep bearing and its other end extending outward from the opposite end thereof, a ball bearing collar assembly supporting said spindle spaced from said footstep bearing, said ball bearing collar assembly comprising a radially outer race ring secured to the spindle bearing housing, a radially inner race ring secured to the spindle, and a plurality of bearing balls located therebetween, said outer race ring having an inwardly directed shoulder located beneath said bearing balls for supporting the same and a race surface extending radially outward with respect to said spindle in the direction of the outer end of said housing, said inner race ring having an outwardly directed shoulder located above said bearing balls to be supported thereon, and a race surface extending radially inwardly with respect to said spindle in the direction of the footstep bearing, at least one of said races having a surface adjacent the respective race surface, which tapers with respect to the axis of the spindle oppositely to the respective shoulder said outer and inner race rings being arranged so that said spindle is rotatably supported on insertion of said spindle within said housing, and said outer and inner race rings are axially separable on movement of said spindle outwardly of said housing.

2. The apparatus according to claim 1 wherein the race surface of the inner and outer rings conform in mirror image to each other.

3. The apparatus according to claim 2 including retaining means extending about the periphery of the outer race ring and securing the outer race ring within said bearing housing, said retaining means having an inner diameter larger than the outer diameter of the inner race ring.

4. The apparatus according to claim 3 wherein said outer race ring is secured within a neck formed in the upper end of said bearing housing and seats on a shoulder formed thereby preventing its axial inward movement.

* * * * *